Figure 1:
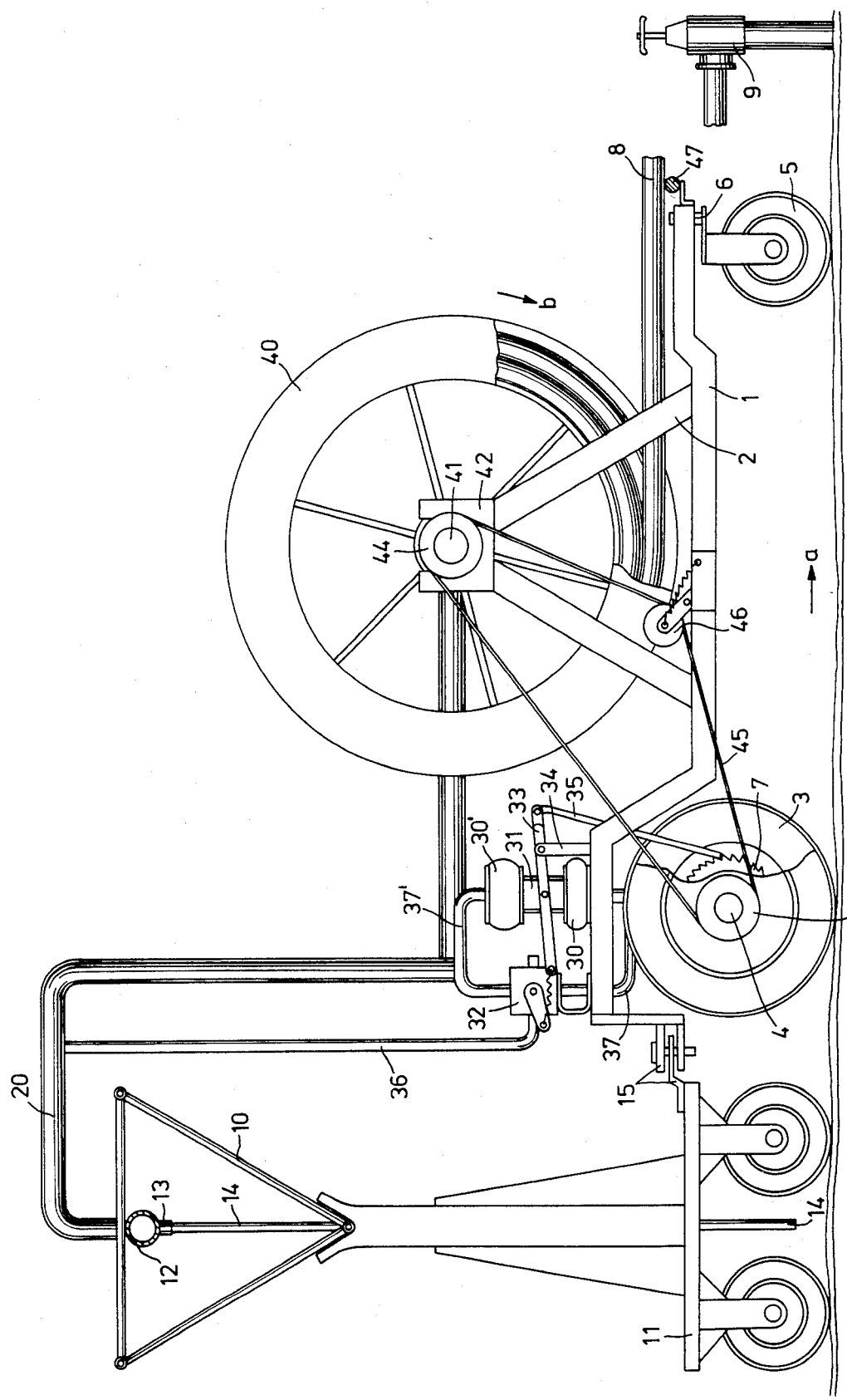

United States Patent [19]

Chiel

[11] Patent Number: 4,488,683
[45] Date of Patent: Dec. 18, 1984

[54] SELF-PROPELLED IRRIGATION EQUIPMENT

[75] Inventor: David Chiel, Afula, Israel

[73] Assignee: Metal Works Ramat David, Israel

[21] Appl. No.: 300,209

[22] Filed: Sep. 8, 1981

[30] Foreign Application Priority Data

Sep. 9, 1980 [IL] Israel ............................ 61002

[51] Int. Cl.³ ................................................ B05B 3/18
[52] U.S. Cl. ................................. 239/199; 137/355.2; 137/355.12; 239/184; 239/191
[58] Field of Search ............... 239/183, 184, 186, 191, 239/199, 709, 721; 137/355.12, 899.1, 355.2, 355.26, 355.27

[56] References Cited

U.S. PATENT DOCUMENTS

| | | | |
|---|---|---|---|
| 3,235,009 | 2/1966 | Nelson | 239/184 |
| 3,430,859 | 3/1969 | Chow | 239/183 |
| 3,507,336 | 4/1970 | Nelson | 239/183 |
| 3,770,202 | 11/1973 | Ivemy et al. | 239/183 |
| 3,942,722 | 3/1976 | Ede | 239/183 |
| 4,119,272 | 10/1978 | Tidwell | 239/178 |
| 4,181,257 | 1/1980 | Moison | 239/183 |
| 4,346,842 | 8/1982 | Botha | 239/183 |

FOREIGN PATENT DOCUMENTS 2353668 5/1975 Fed. Rep. of Germany .
2545056 5/1976 Fed. Rep. of Germany .
2617699 11/1976 Fed. Rep. of Germany .
2715634 10/1977 Fed. Rep. of Germany .
2641638 3/1978 Fed. Rep. of Germany .
2746230 4/1978 Fed. Rep. of Germany .

Primary Examiner—Jeffrey V. Nase
Assistant Examiner—Michael J. Forman
Attorney, Agent, or Firm—Brumbaugh, Graves, Donohue & Raymond

[57] ABSTRACT

Self-propelled irrigation equipment for large planted areas comprises a three-wheeled vehicle carrying a water distribution pipe supported by a telescopic girder, both girder and pipe extending across the vehicle to both sides. The pipe has evenly-spaced outlet openings which deliver water direct to the ground through flexible hoses open at their ends. Water is supplied to the equipment through a large, flexible hose stretched out on the ground between a fixed supply point and a large drum mounted on the vehicle. The vehicle is moved towards the supply point by means of a hydraulic actuator at a velocity proportional to the water quantity passing through the equipment to the ground, while the drum is rotated by a second hydraulic actuator at a rotational speed sufficient to wind up the hose on the drum at the rate of the vehicle's progress. The two actuators are supplied with water through a rotary vane valve common to both actuators, which is governed by the output signal of a water meter measuring the water passing through the vehicle onto the ground.

2 Claims, 5 Drawing Figures

SELF-PROPELLED IRRIGATION EQUIPMENT

BACKGROUND OF THE INVENTION

The invention relates to self-propelled irrigation equipment of the kind distributing water through parallel open-ended hoses while moving across a field.

U.S. Pat. No. 4,283,010 teaches a method of irrigating fields along parallel rows of plants by causing water to flow through a plurality of open-ended flexible hoses laid out in parallel alignment between each two planted rows and by pulling the ends of the hoses gradually along these rows at a speed proportional to the quality of water delivered. The method is carried out by an implement comprising a rotating pair of grooved pulleys for each hose which are adapted to drag the hoses from the farthest point to which they are laid, while water is flowing out of their open ends, down to the location of the implement, whereafter the water supply to the hoses is turned off. After a section has been irrigated, the implement and the hoses are transported to another location or field section for a similar course. By means of this method uniform irrigation for all parallel rows and all along every row is made possible, without any waste of water.

Although the devices working according to the above method give excellent results, they are mostly suitable for small and medium-size plantations; in case huge tracts of land have to be irrigated, such as cotton plantations, transporting of the implement and the hoses from section to section requires relatively much manpower and time. Another drawback of this system, especially if very long hoses are used, is the energy required for dragging the hoses along the rows across the soil, the friction being considerable owing to the heavy weight of the water-filled hoses.

With these drawbacks in view, self-propelled watering implements have been developed in the recent past and are used in the irrigation of vast tracts of land. These irrigation machines consist of large vehicles provided with a long boom extending perpendicular to the direction of travel to both sides of the vehicle and carrying a water-distribution pipe provided with equidistant spouts.

These vehicles are usually driven by an internal combustion engine, as their motion requires considerable energy. Their course is along a water main provided with a hose connection every 30 to 50 m, which serves to supply water to the distribution pipe through a flexible hose of sufficient cross section. During travel of the vehicle between adjacent hose connections the flexible hose is dragged across the soil which not only results in considerable expense of energy but also in increased wear of the hose. Owing to the large drag force acting on the vehicle, it became necessary to provide strong diesel engines, strong tires and a generally strong structure which, obviously, results in heavier weight of the implements which, in their latest embodiments, have become veritable mammoths.

The present invention was made with the object of providing self-propelled irrigation equipment of light weight using little energy, by propelling it by means of a hydraulic actuator which should use only a small portion of the pressure energy contained in the distributed water itself. This demand leads automatically to the requirement of reducing the drag of the connecting hose and, consequently, of making the vehicle itself of light weight.

With those objects in view the irrigation equipment is characterised by the following features: (1) the use of a large drum for gathering on it a connecting hose of about 200 m leading to a water connection in the field. (2) the use of hydraulic actuators adapted to propel the implement and to rotate the drum for respective winding or unwinding of the above hose. (3) Means for propelling the vehicle across the field at a velocity proportional to the water quantity distributed at every moment.

One embodiment of the self-propelled irrigation equipment, according to the invention, comprises a vehicle provided with at least two driving wheels on a common shaft, with at least one free caster wheel, and with hydraulic actuator means adapted to rotate said shaft and said driving wheels; a drum positioned on said vehicle mounted on a shaft parallel to said driving wheel shaft and adapted to be rotated by hydraulic actuator means, said shaft having one hollow end portion; a flexible hose stretched out on the ground to be irrigated, having a first end connected to a stationary water supply point and a second end fastened to said drum shaft communicating with said hollow shaft portion, said hose being adapted to be wound upon, or wound off, said drum at the rate of progress of said vehicle in relation to said water supply point; a water distribution pipe connected to said vehicle extending transversely to both sides of said vehicle and improved with a plurality of, preferably equidistant, water outlets; pipe means for communicatingly connecting said hollow portion of said drum shaft with said distribution pipe; and means for controlling the velocity of said vehicle and of said distribution pipe proportional to the water flow passing through said flexible hose to said distribution pipe.

The vehicle is preferably provided with two drive wheels and one swivelling wheel; the water distribution pipe is carried on a girder extending to both sides of the vehicle, either cantilevered or supported by outer carriages, this girder being foldable about vertical pivots in order to shorten it for transport, and being raised above the ground to permit its passage over the head of high plants.

In a preferred embodiment the vehicle is driven by a hydraulic linear actuator which rotates the driving wheel shaft by means of a pawl-and-ratchet mechanism. The drum is driven by the driving wheel shaft through a belt drive having a high slip-capacity, which allows the drum to be rotated at a slower rate or in opposite sense of rotation to that of the driving wheels, while the hose is unwound off the drum.

The vehicle velocity is controlled by means of a watermeter installed in the line connecting the second end of the hose attached to the drum to the distribution pipe, the watermeter being adapted to transmit suitable signals to a regulating valve installed in the water supply line to the hydraulic actuator.

The implement operates to both sides of a stationary water supply point, e.g. an outlet valve on a water main, whereby the distance travelled by the vehicle is twice the length of the hose. Starting with the hose fully extended, the vehicle will be at a distance of, say, 200 m from the water connection. After the valve has been opened, water flows through the flexible hose and through the drum into the distribution pipe from where it is poured, preferably through short hose sections, into ditches between rows of plants, thus every row obtaining the same water quantity. A part of the total flow is directed into the actuator which drives the vehicle in the direction of the water connection, at a speed proportional to the water supplied through the flexible hose. At the same time the belt drive rotates the drum at a speed slightly faster than would be necessary to wind up the hose, but owing to the resistance of this hose, the belt slips and the hose is wound upon the drum in a few concentric layers. The entire hose is wound upon the drum when the vehicle has reached the connection point. The vehicle continues on its way across this point, and now the hose is unwound off the drum, this being done against the direction of the belt drive which is sufficiently slack to slip under the load. The vehicle is stopped after the entire length of hose has been uncoiled and lies on the ground between the vehicle and the water connection point. The hose is disconnected from the water connection and connected to the following water connection point, whereafter the process is repeated along another stretch of planted area.

Another, move advantageous, manner of operating the implement is to have it travelling twice across the course; starting from the water connecting point with the entire hose wound upon the drum, the vehicle moves away from this point stretching the hose on the ground; the vehicle now returns on its tracks and winds the hose on the drum until it reaches the water point and continues its way in the other direction; on the last stretch it returns to the water point and reaches it with the hose again fully wound on the drum. In this state the implement is readily transported to another section, after the hose has been disconnected and is ready for connection to another connection point. This manner of operation is also advantageous from an irrigation point of view, as only half the necessary quantity of water is distributed during each course which is more easily absorbed by the soil. Compared with the existing methods and apparatus, the main advantage of the present implement is that no energy is wasted in dragging hoses over the ground, permitting a smaller actuator to be used and less pressurised water to be consumed. The energy required for moving the vehicle and the distribution pipe over the ground and for winding up the hose is relatively small, and field tests have shown that a pressure head of 3 m is sufficient to propel the vehicle.

Another embodiment of the invention comprises a vehicle provided with one driven swivel wheel and two free wheels mounted on a common axle, wherein the hose drum and the swivel wheel are each driven by a separate hydraulic linear actuator, both actuators being operated by water passing through the flexible hose to the distribution pipe onto the field to be irrigated. Regulation of the respective speed of the drum and the vehicle is effected by the relative resistance of both driving mechanisms, in that less water is fed to the drum drive whenever the hose tension increases, while a larger water flow is admitted to the vehicle drive. Vice versa, whenever the hose lies slack, and the drum rotating mechanism offers little resistance, then more water enters the actuator, the drum rotates faster and the hose is tightened upon the drum.

The two hydraulic actuators are of the kind having bellows alternately filled and emptied through a reciprocating rotary vane valve, whereby a pivoted lever is urged to and fro. Both actuators are communicatingly connected to the same ports of one common valve which obtains its reciprocating motion through a tension spring attached to the lever of one of the actuators. The valve frequency is controlled by a water meter measuring the water flow passing through the equipment onto the field and an electronic circuit adapted to emit pulses proportional to the revolutions of the water meter, and thus to cause reversal of water flow from one set of bellows to the other. The output of the electronic circuit is adjustable in a manner to permit the vehicle speed to be attuned to the required water quantity distributed over the field, in accordance with the width of the irrigated area, the amount of water per area unit, and other factors.

The beams actuated by the two actuators serve to rotate, in their turn, the hose drum and the driving wheel respectively by pawl-and-ratchet transmissions, in a manner known per se.

Two distribution pipes with equidistant water outlets over its entire length, extend to both sides of the vehicle, perpendicular to the direction of travel, and are supported by two extendible girders which are adapted to be swung into a position close and parallel to the vehicle axis, for the purpose of storing and/or transporting the equipment.

The drum shaft is hollow and is connected at its ends to both branches of the distribution pipe by flexible connectors and shaft seals.

Figure 2:
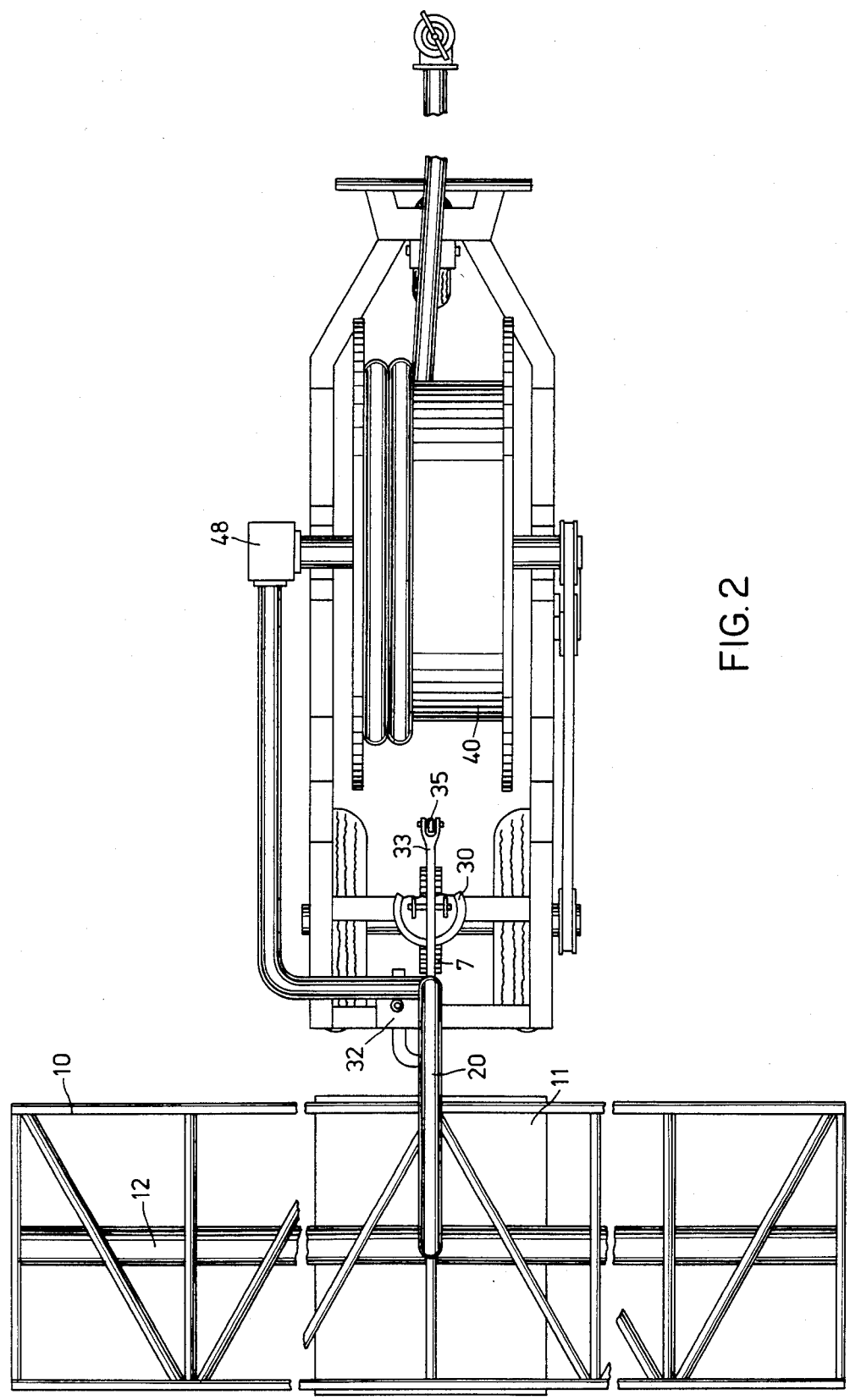
Figure 3:
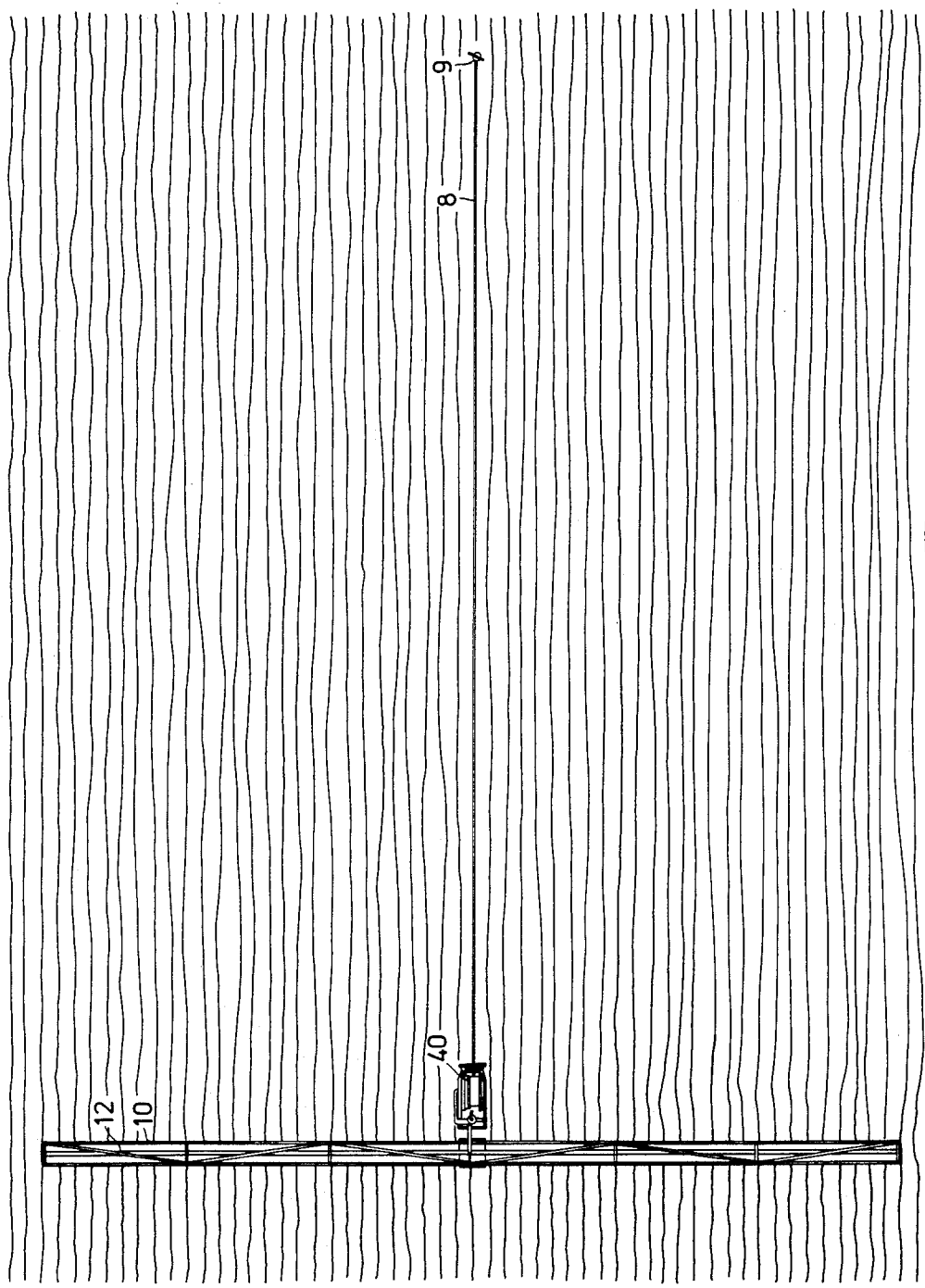
Figure 4:
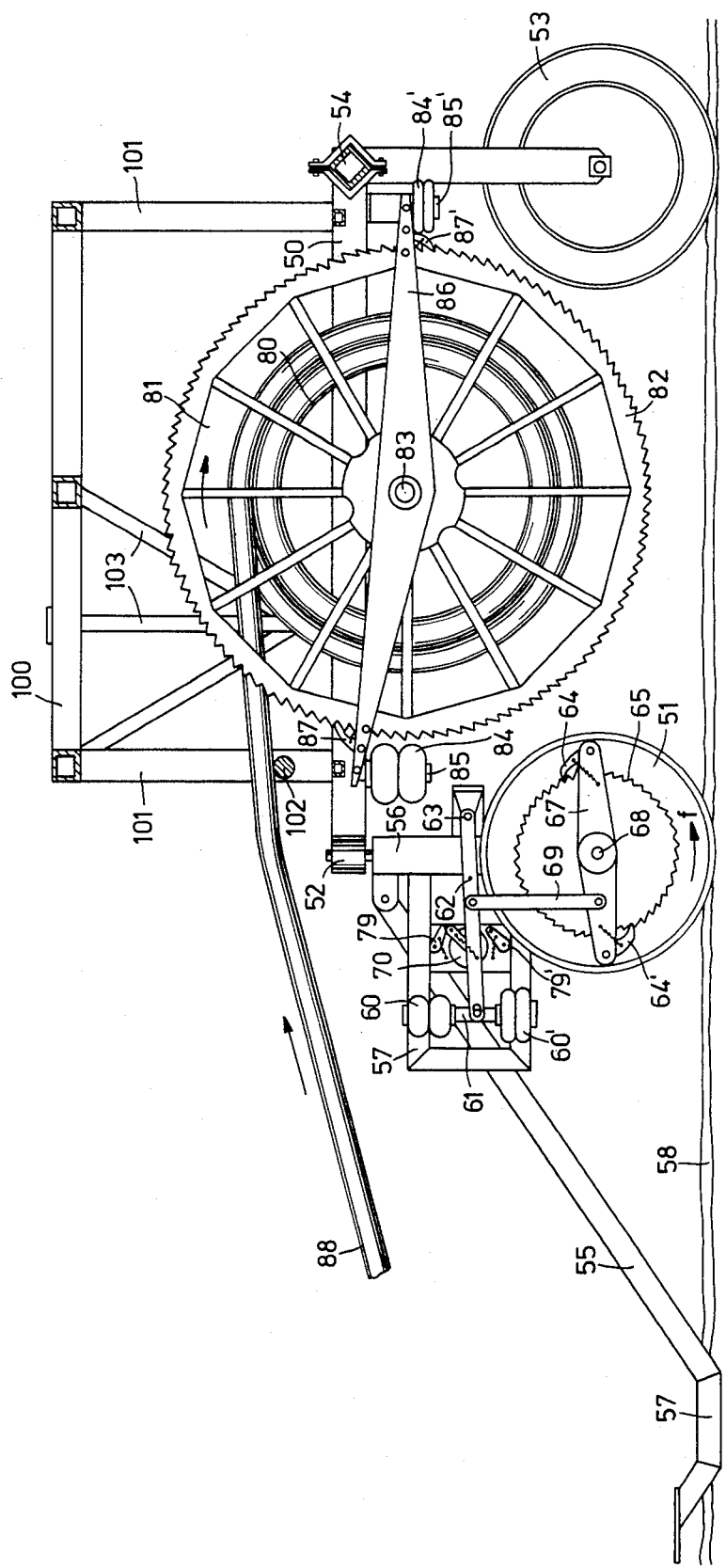
Figure 5:
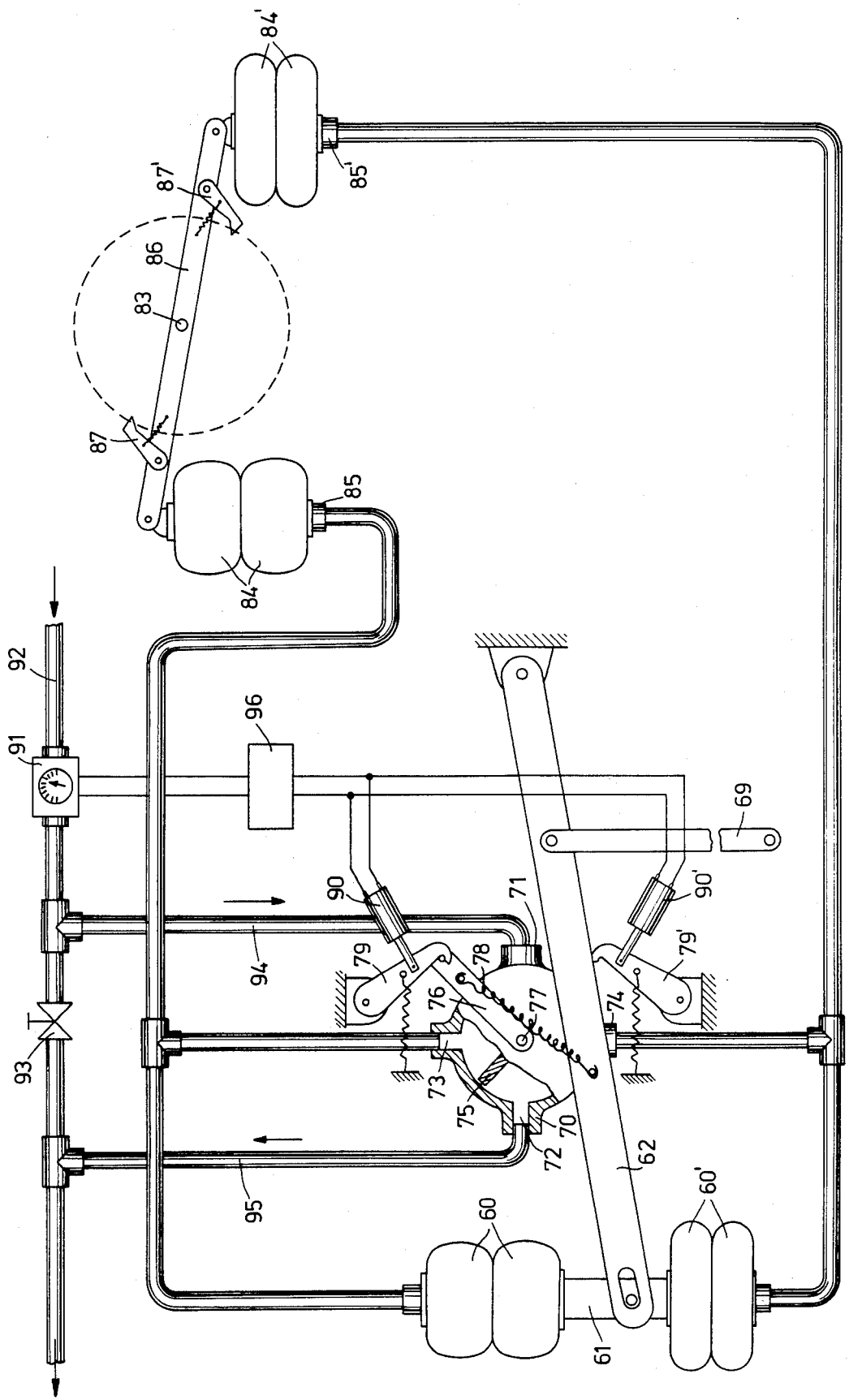

In the accompanying drawings which illustrate, by way of example, two embodiments of the invention, FIG. 1 is part elevation and part section through a self-propelled vehicle carrying a drum and a distribution pipe assembly, FIG. 2 is a plan view of the components shown in FIG. 1, FIG. 3 is a general layout of the equipment, FIG. 4 is an elevation of a second embodiment of a self-propelled irrigation vehicle, and FIG. 5 is diagram of the hydraulic control means of the vehicle drive and drum rotation respectively.

Referring now to FIGS. 1, 2 and 3 of the drawings, a self-propelled vehicle comprises a vehicle frame 1, two parallel drum supports 2 each in the shape of an inverted "V" mounted on the frame 1, two large wheels 3 firmly connected to both ends of a rotatable shaft 4, and a single, small-diameter caster wheel 5 swivellingly fastened to a vertical pivot 6.

The distribution pipe assembly comprises a transversely extending girder 10 of triangular cross section which is supported by two two-wheeled carriages 11 and carries a distribution pipe 12 over its entire length. A plurality of water outlets 13 perforate the underside of the distribution pipe equally spaced, and short pipes or hoses 14 are connected to these outlets, extending to slightly above ground level. The assembly is connected to the vehicle frame by a connecting bar 15 and by a connecting pipe 20, the purpose of which will be detailed further on.

The driving force for the equipment is provided by a hydraulic reciprocating actuator which is the subject matter of U.S. patent application Ser. No. 226,745, now abandoned. The actuator consists of two co-axial superposed bellows 30, 30' which forcefully operate a lever 33 pivoting about a fixed pin 34 by way of a reciprocating connecting rod 31 which is attached to the end covers of both bellows, thus connecting them firmly. The oscillating lever 33 turns a ratchet wheel 7 mounted on the wheel shaft 4 by means of a push rod 35. The bellows are alternately filled and emptied by means of a rotary control valve 32 that is supplied with water under pressure through a pipe 36 and is connected to the two bellows by pipes 37, 37' respectively. The other, free end of the lever 33 swings the rotor of the control valve between two end positions, defining the alternate supply of one of the bellows with water while emptying the other bellow. The ratchet wheel 7 which is also provided with a—not shown—braking pawl, rotates the shaft 4 and the wheels 3, whereby the vehicle moves in the direction of the arrow a.

It will be understood that the actuator illustrated in the drawings is presented as an example only, and that any other hydraulic actuator, either reciprocating or rotary, may be usefully employed for the task required.

A drum 40 fastened on a shaft 41 is supported in bearings 42 on top of the drum supports 2, and is rotatable through a belt drive connecting it to the wheel shaft 4. The belt drive consists of a driving pulley 43 mounted on the protruding end of the wheel shaft 4, of a driven pulley 44 and of a belt 45 which is tensioned by means of a spring-supported tension pulley 46. The belt drive serves to rotate the drum 40 in the sense of rotation indicated by the arrow b, while the vehicle moves in the direction a. The drum serves to wind up a flexible hose 8 which is initially stretched out between a stationary water supply valve 9 and the vehicle at its farthest possible distance from the valve. The hose is guided above the caster wheel 5 on a trestle-shaped guide 47, and is communicatingly connected to the drum shaft 41 which is hollow at one of its ends and communicates from there with the pipe 20 by means of a stuffing box 48 which prevents water from escaping through the joint between the moving and the stationary part.

During working of the equipment the wheel shaft 4 is rotated and drives the wheels and the vehicle, and the drum is similarly rotated by the belt drive and winds the water-filled pipe 8 upon its circumference. The ratio of the two pulleys 43 and 44 is predetermined in such a manner that the drum is rotated at a speed adequate to wind the first layer of hose close to the drum circumference. The drive is, however, adapted to slip sufficiently while the second or the third layer is wound around which requires, owing to the larger coil diameter, a lower rotational speed. This slip is made possible by the tension pulley 46 which overcomes the tension of its spring and gives way as soon as the resistance of the drum pulley 44 becomes too high.

The distribution pipe 12 is supplied with water through the pipe 20 which enters it in its centre, from where the water flows along both sids of the pipe and flows out through the pipes or hoses 14 to irrigate the soil. The pipe 12 is supported over all its length by the girder 10 which may extend to each side for a distance of 30 m, and may be advantageously supported by wheels at both ends.

It being the object of the invention to distribute a uniform and predetermined quantity of water on a planted area, means are provided ensuring that the vehicle travels at a speed proportional to the water flow passing through the distribution pipe onto the field, independent of the pressure changes in the water main owing to changing consumption. This is attained by metering the water flow passing from the flexible hose 8 into the connecting pipe 10, by means of a metering device of known design, and by feeding the output thereof to a pressure reducing element upstream of the control valve 32. This element can be incorporated in the control valve or may be a separate unit. It is preferably electronically operated, but alternatively may be pressure operated. A maximum water flow to the distribution pipe will not throttle the pressure, so that the vehicle can move at maximum speed, and this speed will be reduced as the water flow diminishes, by throttling the pressure to the control valve. Feedback means are provided in a manner known to the art, so as to ensure perfect coordination of flow and vehicle speed.

The vehicle illustrated and described hereinbefore represents a simplified version of the equipment, which is mostly suitable for unidirectional travel towards the water connection point, and away from it in the same direction of travel. However the passage across the point requires that the hose be disconnected and be re-connected without passing across the guide 47, in order not to be entangled with the vehicle wheel 5.

Another embodiment of the vehicle comprises two spaced-apart independent caster wheels instead of the one described, which will permit the hose 8 to be wound and unwound off the drum through guides provided at the bottom of the vehicle frame.

With a view to make the vehicle movable in both directions, i.e. also opposed to the direction of arrow a, an additional ratchet wheel to the existing wheel 7 may be fastened to the shaft 4, having its teeth oppositely directed, and an additional pushrod may be attached to the end of the lever 33 adapted to engage with, and to operate the additional ratchet wheel; by engaging either pushrod with the appropriate ratchet wheel the vehicle will move in the required direction.

FIGS. 4 and 5 illustrate a modified version of the equipment which is essentially characterized by the employment of two separate linear actuators and two pawl-and-ratchet mechanisms for rotating the drum on the one hand, and for providing the vehicle's drive across the field on the other. The vehicle comprises a rectangular frame 50 supported on a driven front wheel 51 adapted to swivel about a vertical pivot 52, and on two free-wheeling rear wheels 53 attached to a rear beam 54 of the frame which permits the adjustment of their lateral distance in accordance with the width of the planted rows.

A drawbar 55 is pivotally attached to the wheel fork 56 and is provided with a guide shoe 57 which, in lowered position of the drawbar, slides along a prepared straight furrow 58 in the ground and guides the vehicle on a straight course. The front wheel is driven by the oscillating movement of a linear actuator (as disclosed in the specification of patent application Ser. No. 226,745, now abandoned) which consists of two pairs of co-axially aligned bellows 60 and 60' having their respective outer ends rigidly attached to a frame 57 and their inner, movable ends interconnected by a connecting rod 61. The connecting rod is pivotally connected to one end of an oscillating lever 62, the other end of which is pivotally attached to a portion 63 of the wheel fork. The reciprocating motion of the connecting rod 61 and the lever 62 is transmitted to the wheel and converted into rotary motion by means of two pawls 64, 64' engaging with the saw teeth of a ratchet wheel 65 integral with the wheel 51. The pawls 64, 64' are pivotally attached to the two ends of a beam 67 which is adapted to oscillate about the axle 68 of the wheel 51. The beam is connected to the lever 62 by another connecting rod 69 which transmits the movement of the lever 62 about its pivot 63 to the beam.

As shown in the drawing, the lever turns the beam in the direction of the arrow f during its downward motion, together with the ratchet wheel which is engaged by the pawls. During upwards motion the pawls slide over the teeth of the ratchet wheel and the vehicle is at a standstill until the next downward movement. Owing to the small scale of the drawing certain details are not shown, such as a catch preventing the return of the wheel, springs urging the pawls into the teeth, and other necessary items in a pawl-and-ratchet mechanism. The bellows 60 are filled and emptied through a rotary vane valve 70 which—in the drawing—is partly obscured by the lever 62; the vane valve is connected to the lever 62 by spring means and is rotated clock-wise and anti-clockwise about a given angle by the lever's movement, as will be explained in detail with reference to FIG. 5 of the drawings.

A hose drum comprises a cylindrical central portion 80 and two spoked wheels 81 bounding the central portion on both sides; one of the wheels is provided with a saw-toothed rim 82. The drum is mounted on a hollow shaft 83 which is rotatably fastened to the frame 50 and is provided at its end with a sealing connection to a distribution pipe extending across and to both sides of the vehicle, similar to the equipment illustrated in FIGS. 1 and 2. The drum is rotated in a manner similar to the wheel 51, by means of expanding and contracting bellows, 84, 84', which are rigidly connected to the frame 50 by means of brackets 85, 85', to both sides of the toothed rim 82. The bellows communicate, by flexible hoses, with the vane valve 70 which serves to alternately fill and empty the opposite bellows, thereby actuating a symmetric beam 86 and moving it oscillatingly about an axle forming an extension of the drum shaft 83.

Two pawls, 87, 87', are attached to the ends of the beam 86 and are adapted to engage with the teeth of the rim 82. The teeth are in saw-shape, permitting rotation of the drum in the direction of the arrow s only. It is readily understood that rotary motion of the beam in the direction of the arrow s, due to the expansion of the bellows 84 and the contraction of the bellows 84', will take the drum with it, while the pawls will slip over the teeth during the beam's motion in opposite direction. The drum's rotation will wind the hose 88 onto the cylindrical portion 80 in several, superposed layers, it being understood that the drum size should be designed so as to accommodate the entire length of the hose previously stretched out on the ground.

FIG. 4 also shows, in outlines, the structure supporting the distribution pipe which, in contradistinction to the equipment in FIGS. 1 and 2, is mounted on top of the vehicle itself. The supporting structure consists of an upper, rectangular and reinforced frame 100 which is supported by, and connected to, the main frame 50 by four standards 101. The two front standards are interconnected by a pipe 102 which serves both as support and guide for the hose 88.

The distribution pipe (which is not visible in the drawing) is supported by girders 103 of triangular cross section, extending to both sides of the structure and being fastened to it on pivots which permit their folding in a position parallel to the axis of the vehicle. The girders are preferably made in several sections which are adapted to be contracted and nested telescopically, so as to take up less room during transport and storage.

At this opportunity it is pointed out that the equipment of FIG. 4 is only suitable for uni-directional progress between the farthest point from a water connection to the end of the hose close to the connection itself. The mechanism for alternate filling and emptying of the bellows is shown diagrammatically in FIG. 5 illustrating in detail the operation of the lever 62 and the beam 86 by the bellows, 60, 60', and 84, 84', respectively. A rotary vane valve 70 is positioned opposite the lever 62 coaxial with the lever's central position coinciding with uniform expansion of both sets of bellows. The valve is provided with four, cross-wise positioned ports, viz. a water inlet 71, a water outlet 72, and at right angles to these ports two ports 73 and 74 communicating with opposite sets of bellows. The valve vane 75 is movable in the cylindrical casing between two positions, in which the water inlet and water outlet ports are alternately connected to the ports 73 and 74. In the position of the vane shown in the drawing the inlet port 71 communicates with port 73 and the outlet port 72 with port 74; in the second position port 74 communicates with the water inlet and port 73 with the water outlet port. The movement of the vane is obtained by rotation of an arm 76, on the outside of the valve casing, both arm and vane being rigidly mounted on a common shaft 77. The arm 76 is resiliently attached to the lever 62 by means of a spiral spring 78 which is adapted to swing the arm 76 between an upper and a lower position in accordance with the upward and downward motion of the lever 62. The two ports 73 and 74 are connected, by flexible pipe lines, to both actuators 60, 60' and 84, 84' operating the drum as well as the wheel 51. The lines are split, thereby causing the port 73 to communicate with both the bellows 60 of the wheel drive and with the bellows 84 of the drum drive; similarly, the port 74 communicates with bellows 60' and 84'.

In the shown position of the vane water entering the valve through port 71 is directed to the bellows 60 and 84, expanding them against the resistance of the wheel and the drum, while water is driven out of the contracting bellows 60' and 84' through the outlet port 72. This action urges the lever 62 in upward direction, whereby the pawls 64 and 85 engage with the sawteeth and rotate both wheel 51 as well as the drum (80, 81). While the beam 62 has reached its lowermost position the spring 78 is highly tensioned, thus exerting a downward directed force on the arm 76; this arm, however, is held in its position by an upper hinged hook 79 which holds the arm in the upper position until the hook is pulled back by the force of the iron core of an energised solenoid. At this moment the tensioned spring 78 swings the arm 76 downwards, until it engages with a lower, similar hook 79', similarly monitored by a solenoid 90'.

The two hooks and solenoids serve to control the velocity of the vehicle and the rotation of the drum which corresponds to the vehicle velocity, in that it winds the hose 88 tightly on the drum.

The solenoids are monitored by a water-meter 91 and an electronic circuit 96 which receives pulses in accordance with the revolutions of the watermeter and transmits pulses to the solenoids at a predesignated ratio. The electronic circuit is adjustable to drive the vehicle at a speed proportional to the area to be irrigated and the water quantity to be distributed over this area per time unit.

As a concrete example: assuming that 1000 m$^2$ of land require 100$^3$ of water and that the distribution pipe is 50 m long—25 m to each side—and that the equipment is built to distribute 100 m$^3$/h, then the vehicle speed should be 20 m/h, whereby 1000 m$^2$ will be covered in one hour. Further assuming that the driving front wheel has a diameter of 0.8 m, i.e a circumference of 2.5 m, then the wheel will have a rotational speed of 8 revolutions per hour. The drum must be rotated at a similar circumferential speed in order to wind up the hose at the rate of progress of the equipment.

The rotational speed of the drum is not direct proportional to the vehicle speed, since its rotation has to vary in accordance with the length of hose wound upon it. Automatic adjustment of the speed is attained by supplying water under the same pressure to both linear actuators (60 and 84) through one of the ports 73, 74 of the rotary vane valve. The quantity supplied to the drum actuator depends on the resistance offered by the hose; a reduced quantity will flow into the bellows 84, if the hose is strongly tensioned, and a larger quantity when the hose is slack, offering a lower resistance to the pull. In this way the speed of the vehicle and the winding up of the hose are smoothly coordinated, the present arrangement being preferable to the slipping belt described with reference to FIG. 1.

The vane valve 70 is installed in a shunt of the main water line 92 connecting the flexible hose connection to the drum with the distribution pipe. FIG. 5 shows the main water pipe 92 passing—from right to left—through the water meter 90 and through a regulating valve 93, to the distribution pipe. The rotary vane valve 70 is supplied with water through a pipe which branches off the main line upstream of the regulating valve 93 and the water returns from the vane valve through a pipe 95 entering the main line downstream of the valve 93. The valve 93 is closed to throttle the throughflow to a degree to create a pressure differential sufficient to operate the linear actuators against the resistance of the ground and the resistance of the hose. In fact, the winding up of the hose also assists the progress of the vehicle across the field, the two actuators working substantially in the same direction.

The electronic circuit (96) receives the output of the watermeter 91 in the form of pulses at the rate of its revolutions and is set to produce an energising pulse to the two solenoids 90 and 90' in accordance with the desired velocity of the equipment. Returning to the aforementioned example and assuming an hourly water flow of 100 m$^3$ and a progress of 20 m/h, then the front wheel should be rotated by the actuator about an angle of about 29° for every m$^3$ passing through the watermeter. Depending on the angle of progress for every oscillation of the actuator, the ratio is easily calculated and the electronic circuit readily adjusted to the desired progress. It is understood that the mechanism driving the drum is suitably dimensioned so as to match the winding up of the hose to the vehicle speed.

Since both hooks 79, 79' are to be retracted and released to grip the arm 76 at the same time, it is proposed to provide only one solenoid connected to both solenoids.

The main advantage of the present equipment is the avoidance of friction between flexible hoses and the ground, as no hose is trailed along during motion of the vehicle and of the distribution pipe. The long supply hose 8 permits the irrigation of long stretches without interruption and permits furthermore the provision of stationary water supply points at relatively great distances from each other, in any case much greater than would be possible with a supply pipe which has to be dragged across the field.

I claim:

1. Self-propelled irrigation equipment for irrigating large planted areas, comprising:
    a vehicle provided with a frame and with two free rear wheels on a common axle and with one driving front swivel wheel,
    swivelling support means supporting said driving wheel for swivelling motion with respect to the frame,
    first hydraulic actuator means mounted on said swivelling support means and connected to said driving wheel for rotating said driving wheel;
    a drum positioned on said vehicle having a hollow support shaft extending generally parallel to said common axle to which the drum is affixed, said shaft having at least one hollow end portion;
    second hydraulic actuator means mounted on said frame and connected to said drum for rotating said drum and hollow support shaft;
    a flexible hose having a first end adapted to be connected to a stationary water supply point and a second end fastened to said hollow shaft in communication with said hollow end portion;
    a water distribution pipe mounted on and extending transversely to both sides of said vehicle and provided with a plurality of water outlets each having one end of a trailing hose connected thereto, the other ends of the trailing hoses being are open to emit water adjacent to the ground;
    first pipe means connecting said hollow shaft portion with said distribution pipe for communicating water thereto;
    second pipe means for supplying water from the first pipe means to the first hydraulic actuator means to rotate the driving wheel;
    means associated with the first pipe means for controlling the rotation of said driving wheel for moving said vehicle at a velocity generally proportional to the quantity of water flowing through said first pipe means to said distribution pipe;
    third pipe means for supplying water from the first pipe means to the second hydraulic actuator means to rotate the drum; and
    means for controlling the rotation of said drum for winding said flexible hose upon said drum in several layers at a speed which is dependent on the resistance exerted by the hose to the drum rotation.

2. The irrigation equipment of claim 1, wherein said first and said second actuator means are hydraulically connected to a common rotary vane valve which directs a certain quantity of water supplied through said flexible hose to said two actuators and returns the water to said distribution pipe, and including electrical control means responsive to the flow of water through the first pipe means for operating the rotary vane valve in response to passage of a selected quantity of water therethrough.

* * * * *